United States Patent
Berdan et al.

(10) Patent No.: US 11,221,455 B2
(45) Date of Patent: Jan. 11, 2022

(54) FIBER OPTIC SPLITTER MODULES AND SYSTEMS

(71) Applicant: Connectivity Solutions Direct LLC, Mentor, OH (US)

(72) Inventors: Brian J. Berdan, Montgomery, MN (US); Manuel Veyna, Jr., Grand Prairie, TX (US); Wade J. Womack, Allen, TX (US); Joseph C. Livingston, McKinney, TX (US)

(73) Assignee: Connectivity Solutions Direct LLC, Mentor, OH (US)

( * ) Notice: Subject to any disclaimer, the term of this patent is extended or adjusted under 35 U.S.C. 154(b) by 0 days.

(21) Appl. No.: 16/932,145

(22) Filed: Jul. 17, 2020

(65) Prior Publication Data

US 2021/0018709 A1     Jan. 21, 2021

Related U.S. Application Data

(60) Provisional application No. 62/875,499, filed on Jul. 17, 2019.

(51) Int. Cl.
*G02B 6/00* (2006.01)
*G02B 6/44* (2006.01)
(52) U.S. Cl.
CPC .................. *G02B 6/4452* (2013.01)
(58) Field of Classification Search
CPC .................. G02B 6/4452; G02B 6/00
See application file for complete search history.

(56) References Cited

U.S. PATENT DOCUMENTS

| | | | |
|---|---|---|---|
| 7,198,409 B2 | 4/2007 | Smith et al. | |
| 7,218,827 B2 | 5/2007 | Vongseng et al. | |
| 7,233,731 B2 | 6/2007 | Solheid et al. | |
| 7,277,620 B2 | 10/2007 | Vongseng et al. | |
| 7,407,330 B2 | 8/2008 | Smith et al. | |
| 7,457,503 B2 | 11/2008 | Solheid et al. | |
| 7,515,805 B2 | 4/2009 | Vongseng et al. | |
| 7,519,259 B2 | 4/2009 | Smith et al. | |
| 7,720,344 B2 * | 5/2010 | Tang .................. | G02B 6/4452 385/135 |
| 7,809,233 B2 | 10/2010 | Smith et al. | |
| 7,809,234 B2 | 10/2010 | Smith et al. | |
| 7,826,706 B2 | 11/2010 | Vongseng et al. | |
| 7,841,775 B2 | 11/2010 | Smith et al. | |
| 7,844,159 B2 | 11/2010 | Solheid et al. | |
| 7,980,768 B2 | 7/2011 | Smith et al. | |
| 7,995,894 B2 | 8/2011 | Solheid et al. | |

(Continued)

OTHER PUBLICATIONS

US 9,804,353 B2, 10/2017, Solheid et al. (withdrawn)

(Continued)

*Primary Examiner* — Jennifer Doan
(74) *Attorney, Agent, or Firm* — Hubbard Johnston, PLLC

(57) ABSTRACT

In one instance, a fiber distribution hub includes a fiber distribution cabinet and a fiber optic splitter module coupled to and disposed within the fiber distribution cabinet. The fiber optic splitter module has horizontal (perpendicular to gravity) top and bottom rails and vertically (parallel to gravity) mounted splitter assemblies. In some instances, the distribution ports are downwardly oriented to facilitate cable management. Cable management systems are also included. Other aspects are presented.

22 Claims, 9 Drawing Sheets

(56) References Cited

U.S. PATENT DOCUMENTS

| | | |
|---|---|---|
| 8,184,940 B2 | 5/2012 | Smith et al. |
| 8,210,756 B2 | 7/2012 | Smith et al. |
| 8,401,357 B2 | 3/2013 | Solheid et al. |
| 8,538,228 B2 | 9/2013 | Smith et al. |
| 8,636,421 B2 | 1/2014 | Smith et al. |
| 8,794,852 B2 * | 8/2014 | Barron ................. G02B 6/4472 385/96 |
| 8,811,791 B2 | 8/2014 | Solheid et al. |
| 8,818,158 B2 | 8/2014 | Smith et al. |
| 9,122,019 B2 | 9/2015 | Smith et al. |
| 9,201,206 B2 | 12/2015 | Smith et al. |
| 9,250,408 B2 | 2/2016 | Solheid et al. |
| 9,304,276 B2 | 4/2016 | Solheid et al. |
| 9,341,798 B2 | 5/2016 | Smith et al. |
| 9,354,415 B2 * | 5/2016 | Nair .................... G02B 6/4454 |
| 9,470,851 B2 | 10/2016 | Smith et al. |
| 9,541,724 B2 | 1/2017 | Solheid et al. |
| 9,784,928 B2 | 10/2017 | Smith et al. |
| 10,126,509 B2 | 11/2018 | Smith et al. |
| 10,151,896 B2 | 12/2018 | Solheid et al. |
| 10,168,491 B2 | 1/2019 | Smith et al. |
| 10,274,686 B2 | 4/2019 | Smith et al. |
| 10,345,539 B2 | 7/2019 | Smith et al. |
| 10,371,915 B2 | 8/2019 | Solheid et al. |
| 10,436,998 B2 | 10/2019 | Solheid et al. |
| 10,527,809 B2 | 1/2020 | Solheid et al. |
| 10,634,859 B2 | 4/2020 | Smith et al. |
| 10,634,860 B2 | 4/2020 | Smith et al. |
| 10,782,497 B2 | 9/2020 | Solheid et al. |
| 10,809,467 B2 | 10/2020 | Smith et al. |

OTHER PUBLICATIONS

U.S. Pat. No. 9,804,353 dated Oct. 31, 2017 in the name of CommScope Technologies LLC (withdrawn and not readily available).

* cited by examiner

FIBER OPTIC SPLITTER MODULES AND SYSTEMS

CROSS-REFERENCE TO RELATED APPLICATION

This application claims the benefit of U.S. Provisional Application Ser. No. 62/875,499, filed by Brian J. Berdan, et al., on Jul. 17, 2019, entitled "Fiber Optic Splitter Modules and Systems," which is incorporated herein by reference in its entirety for all purposes.

TECHNICAL FIELD

This application is directed, in general, to fiber optics, and more particular to fiber optic splitter modules or hubs and systems.

BACKGROUND

Passive optical networks have grown in popularity for delivering high-speed communication data. The networks are seen as being desirable, in part, because they do not need to employ active electronic devices, such as amplifiers or repeaters. Such networks include fiber optic splitters and other devices that assist in delivering signals to end users, or subscribers. As passive optical networks increase in popularity and use, improvements are desired.

SUMMARY

According to an illustrative embodiment, a fiber distribution hub for use in a passive optical network includes an internal frame having a top rail and a bottom rail. The top rail and bottom rail are displaced from one another and extend longitudinally in a first direction that is perpendicular to a gravity field. The top rail has a front longitudinal edge and the bottom rail has a front longitudinal edge. The fiber distribution hub further includes at least one splitter assembly coupled between the top rail and bottom rail and extending longitudinally parallel to the gravity field.

Each of the at least one splitter assembly includes a first side panel, a second side panel, and one or more side walls coupled to the first side panel and the second side panel that together form an interior space. The at least one splitter assembly further includes a front opening between a leading edge of the first side panel and a leading edge of the second side panel, and includes at least one input adapter port disposed in an upper portion of the front opening proximate the top rail. The at least one splitter assembly also includes a plurality of distribution ports disposed in the front opening below the input adapter and above the bottom rail and includes a storage rack coupled to the top rail and the bottom rail and extending parallel to the gravity field. The storage rack is for holding subscriber distribution cables that have yet to be coupled to one of the plurality of distribution ports.

In another illustrative embodiment, the fiber distribution hub described above further includes a vertical cable manager coupled between the front longitudinal edge of the top rail and the front longitudinal edge of the bottom rail.

According to still another illustrative embodiment, a fiber distribution hub includes a fiber distribution cabinet and a fiber optic splitter module coupled to and disposed within the fiber distribution cabinet. The fiber optic splitter module includes a top rail and a bottom rail coupled to the fiber distribution cabinet. The top rail and bottom rail are displaced from one another and extend longitudinally in a first direction that is perpendicular to a gravity field. The top rail has a front longitudinal edge and the bottom rail has a front longitudinal edge. The fiber distribution hub further includes at least one splitter assembly coupled between the top rail and bottom rail and extending longitudinally parallel to the gravity field.

The at least one splitter assembly includes a housing body having a first side panel and a second side panel. An interior space is formed in the housing body. The at least one splitter assembly further includes a front opening between a leading edge of the first side panel and a leading edge of the second side panel; an input adapter port disposed in an upper portion of the front opening proximate the top rail, the input adapter port sized and configured to receive an input adapter; and a plurality of distribution ports disposed in the front opening below the input adapter and above the bottom rail.

The fiber distribution hub also includes a vertical cable manager coupled between the front longitudinal edge of the top rail and the front longitudinal edge of the bottom rail, and a storage rack coupled to the top rail and the bottom rail and extending parallel to the gravity field. The storage rack is for holding subscriber distribution cables that have yet to be coupled to one of the plurality of distribution ports.

According to still another illustrative embodiment, a method of manufacturing a field distribution hub for use in a passive optical network includes forming a cabinet and forming a frame having a top rail and a bottom rail. The top rail and bottom rail are displaced from one another and extend longitudinally in a first direction that is perpendicular to a gravity field. The top rail has a front longitudinal edge and the bottom rail has a front longitudinal edge. The method also includes coupling at least one splitter assembly between the top rail and bottom rail. The at least one splitter assembly extends longitudinally parallel to the gravity field when in an installed position. The at least one splitter assembly is of the type described above.

In another illustrative embodiment, the method just presented further includes coupling a vertical cable manager between the front longitudinal edge of the top rail and the front longitudinal edge of the bottom rail; and coupling a storage rack to the top rail and the bottom rail such that the storage rack extends parallel to the gravity field. The storage rack is for holding subscriber distribution cables that have yet to be coupled to one of the plurality of distribution ports. Other embodiments and aspects are presented below.

DESCRIPTION OF THE DRAWINGS

Illustrative embodiments of the present invention are described in detail below with reference to the attached drawing figures, which are incorporated by reference herein and wherein.

DETAILED DESCRIPTION

Figure 1:
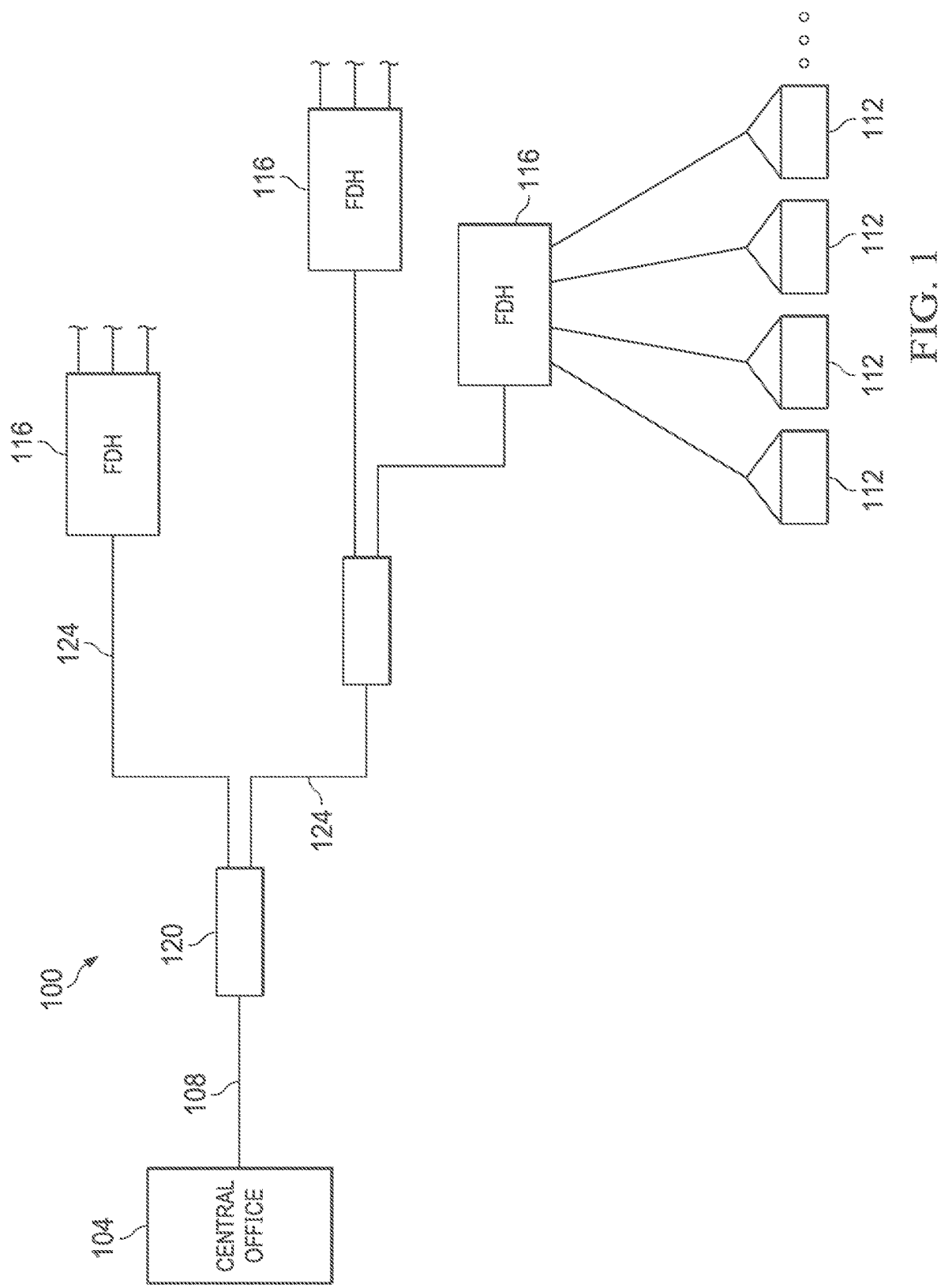
FIG. 1 is a schematic diagram of an illustrative passive fiber optic network.

In the following detailed description of the preferred embodiments, reference is made to the accompanying drawings that form a part hereof, and in which is shown, by way of illustration, specific embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the claims. Unless otherwise indicated, as used throughout this document, "or" does not require mutual exclusivity.

Passive optical networks are becoming increasingly popular and prevalent for number of reasons. They can deliver high bandwidth communications to customers while avoiding active electronic devices between the central office and the subscriber. In such systems, a signal comes from a central office that connects to a number of subscribers, or end users, in the network. The central office also connects to a larger network such as the Internet. The network can include fiber distribution hubs (FDH; see 116 in FIG. 1) having one or more optical splitter assemblies.

The splitter assemblies generate a number of individual fibers that may be distributed to the premises of an end-user or subscriber. The fibers of the network can be above ground or housed within underground conduits. The network can include a number of breakout locations at which point branch cables are separated out from the main cable lines to go to different locations. The branch cables can be connected to a fiber optic splitter module that include connector interfaces or modules for facilitating coupling of the fibers from the branch cables to the plurality of end users or subscribers. Fiber-optic splitters are used in the fiber distribution hubs to accept one or more feeder cables having a number of fibers that may be split into individual distribution fibers.

To favorably address the impact to the deployment environment, it would be desirable to have smaller fiber distribution hubs that include fiber-optic splitter modules having smaller footprints. As smaller footprints are contemplated, improvements are needed with respect to cable management within the fiber distribution cabinet of the fiber distribution hub.

According to one aspect of the disclosure, in contrast to existing cabinets that have vertical rails (parallel to gravity) with horizontal panels (perpendicular to gravity) added for patch fields (i.e., they expand vertically), an illustrative embodiment presented here has horizontal rails and vertical panels to define the patch fields (i.e., that expand horizontally). The splitter module is oriented 90 degrees from systems used at the present. This is believed to improve the organization and access within the cabinet. This arrangement keeps the field open where one is trying to make changes and it may keep cables more organized in a more natural or automatic way. The splitter assemblies herein can be utilized and numbered differently. As another aspect of the disclosure, the distribution ports may be angled downward (more in the direction of the gravity field) to make cable management easier and more natural. Other aspects are presented further below.

In an illustrative embodiment herein, the ports of a splitter assembly are numbered from the bottom of the splitter assembly to the top and left to right. Whereas, if one makes an analogy of port location and numbering to an Excel spreadsheet, the industry currently starts at A1 (top left) and then goes horizontally to B1 and then C1 etc., and when the right-most top port (out cell in the Excel analogy) is reached, cell A2 is then used. This approach means that the connected distribution cables are laid on top of each other—more with each subsequent row. A technician has to sort through all the cables already patched above while the gravity is pulling them down across available ports; this impairs his or her vision in the patch field as the technician tries to find where to connect.

Referring now to the drawings and initially to FIG. 1, an illustrative passive fiber optic network 100 is presented. The passive fiber optic network 100 includes a central office 104 having passive optical fibers or lines 108 that ultimately connect to one or more subscribers, or end users 112. The central office 104 receives a signal from a larger network (not shown). The passive fiber optic network 100 includes one or more optical fiber distribution hubs (FDH) 116, or local convergence points (LCP). Each fiber distribution hub 116 comprises a splitter assembly having a combined optic splitter and distribution patch field module or system as will be described further below. The fiber lines or cables 108 may include one or more break-out locations 120 where branch cables 124 are separated from main cables 108. As noted above, the disclosure, among other things, presents an improved splitter module for use as an aspect of the fiber distribution hub 116.

Figure 2:
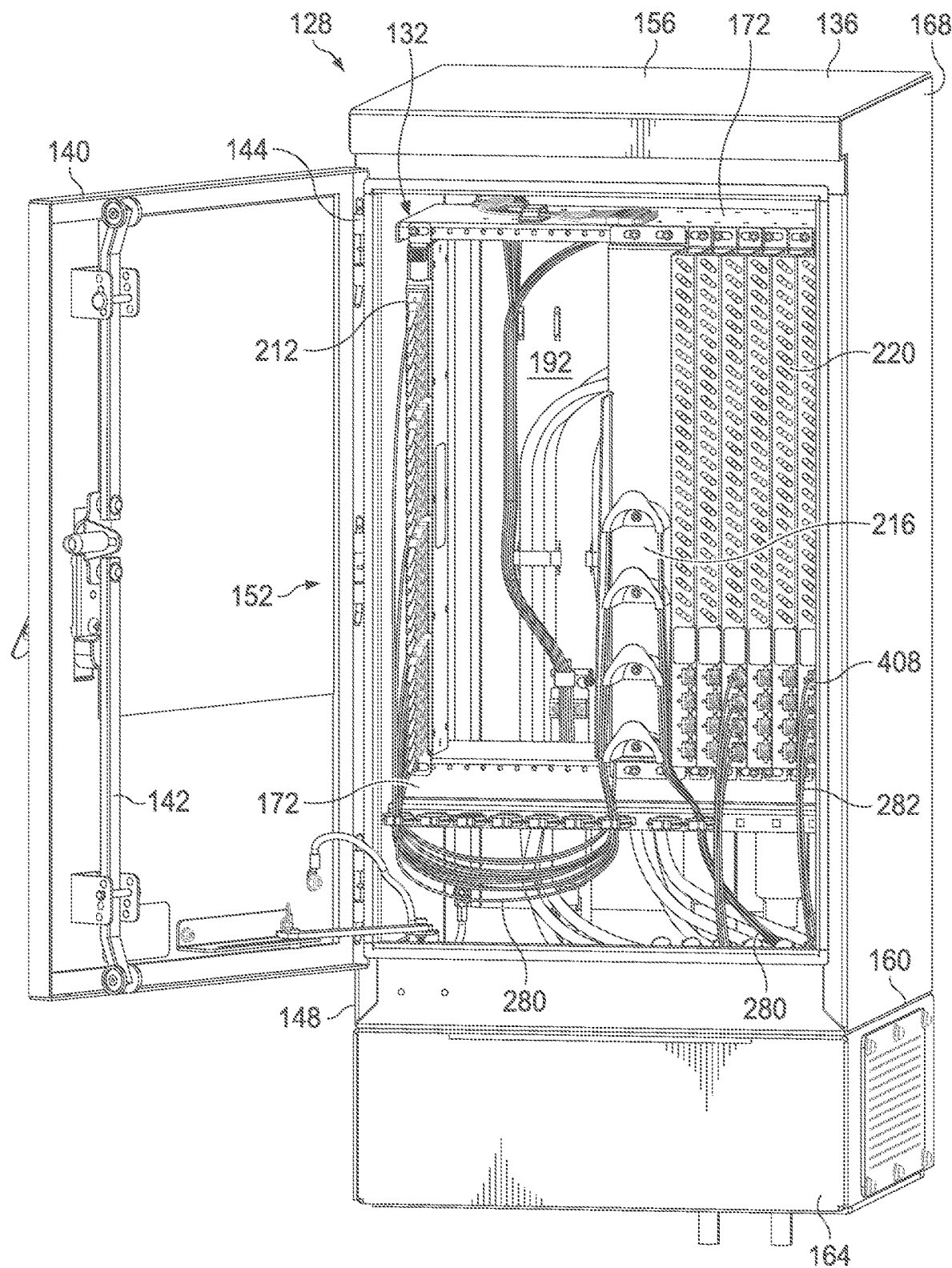
FIG. 2 is a schematic, perspective view of an illustrative embodiment of a fiber distribution hub having an illustrative embodiment of a fiber optic splitter module therein.

Referring now primarily to FIG. 2, an illustrative embodiment of an optical fiber distribution hub (FDH) 128, or local convergence point (LCP), is presented that includes an illustrative embodiment of a combined fiber optic splitter and distribution patch field module or system 132, splitter module 132. The fiber distribution hub 128 comprises a fiber distribution cabinet 136 having a cabinet door or panel door 140 that can swing open to an open position on hinges 144 that are coupled to a main body 148. The cabinet door 140 may include a locking mechanism 142 for securing the door 140 in a closed position and releasing the door 140 to allow for an open position as shown. In the open position of the cabinet door 140, a front opening 152 is accessible. The front opening allows a technician access to the interior. The cabinet 136 may include gaskets in places and vents in others as one skilled in the art would understand. The cabinet 136 includes a top panel 156, a bottom panel 160 that may be on a riser 164, and a plurality of side panels 168 to form an enclosed space for equipment and connections.

The fiber optic splitter module 132 may be mounted within the enclosed space of the cabinet 136 using an internal frame 172. In one embodiment, the cabinet 136 has a rectangular elevational cross section. In one illustrative embodiment, a long dimension of the cross section is 18.125 inches and a short dimension is 17 inches, but one skilled in the art will appreciate that other dimensions may be readily used. In another illustrative embodiment, the long dimension is 30 inches and the short dimension is 18.125 inches. The cabinet 136 may have different heights, but in one illustrative embodiment has a height of 31.5 inches, but again other dimensions may be readily used, e.g., a height between 42 and 49 inches. The cabinet 136 may include cable management devices, e.g., rods and spools or storage devices. The illustrative cabinet 136 is shown configured for 288 connectorized fibers (6×48), but other numbers may be used, such as 144, 432, 576, 864, 1782, or other numbers.

Figure 3:
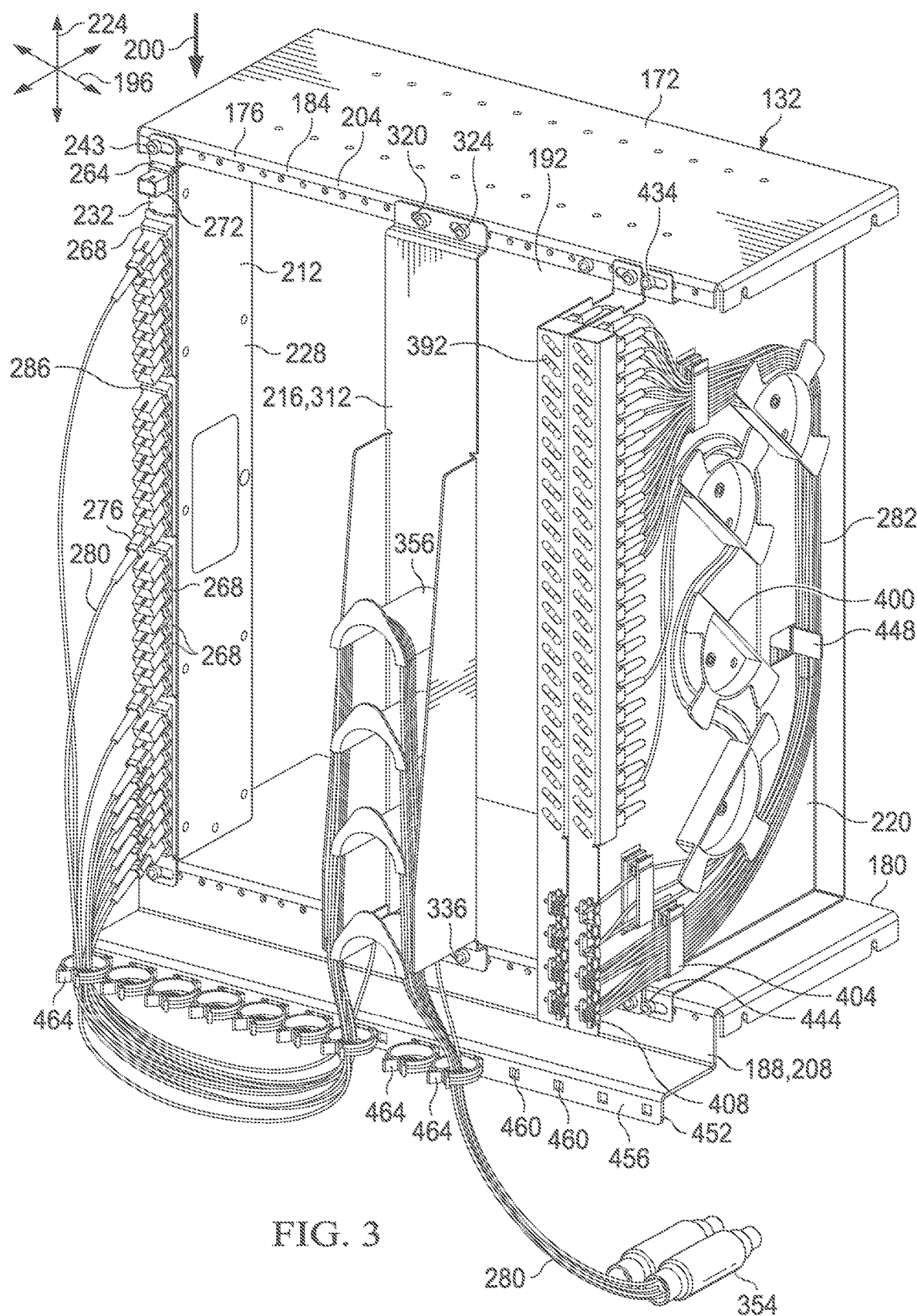
FIG. 3 is a schematic, perspective view of an illustrative embodiment of a fiber optic splitter module.

Referring now primarily to FIG. 3, the illustrative embodiment of the fiber optic splitter module 132 is presented in more detail. The fiber optic splitter module 132 comprises certain internal components from the cabinet 136. The fiber optic splitter module 132, when assembled, may include a top rail 184, a bottom rail 188, and a splitter assembly 212. In some embodiments, fiber optic splitter module 132 may further include a vertical cable manager 216 or a storage rack 220.

The fiber optic splitter module 132 has a front side 176 and a back side 180. The fiber optic splitter module 132 includes the internal frame 172 having a top rail 184 and a bottom rail 188, which may be spaced using one or more of the cabinet walls. Reference 192 shows where the back wall or panel of the cabinet 136 would be. The top rail 184 and bottom rail 188 are displaced from one another and extend longitudinally in a first direction 196 (horizontally) that is perpendicular to a gravity field 200. The top rail 184 has a front longitudinal edge 204, and the bottom rail 188 has a front longitudinal edge 208. The rails 184, 188 may be spaced apart from one another a standard 19 inches in compliance with EIA/ECA-310-E, but have been turned 90 degrees from typical industry use. The EIA/ECA 310-E is the rack standard set by the Electronic Industries Association and has been used for many years. Other dimensions for the rails 184, 188 or their displacement from one another may be used in other embodiments.

Coupled to the internal frame 172 is at least one splitter assembly 212, at least one vertical cable manager 216, and at least one storage rack 220 (two shown in FIG. 3). The one or more splitter assemblies 212 is coupled between the top rail 184 and bottom rail 188 and extends longitudinally parallel to the gravity field 200 in a second direction 224, which is vertical. As used herein, "splitter assembly" is meant to be broadly interpreted to include devices that split the signal in any way. In some embodiments the splitter assembly 212 splits the power, splits the signal wavelength, or a combination. In some embodiments, the splitter assembly 212 includes a Planar Light Circuit (PLC) Device, which is a type of optical power management device that features a wide operating wavelength range and good channel-to-channel uniformity and is widely used in PON (EPON/GPON) networks to realize optical signal power splitting. In some embodiments, the splitter assembly 212 includes xWDM's, which are used to combine and separate optical signals transmitted on different wavelengths, which is widely used in optical transmission network and network status monitoring.

Figure 4:
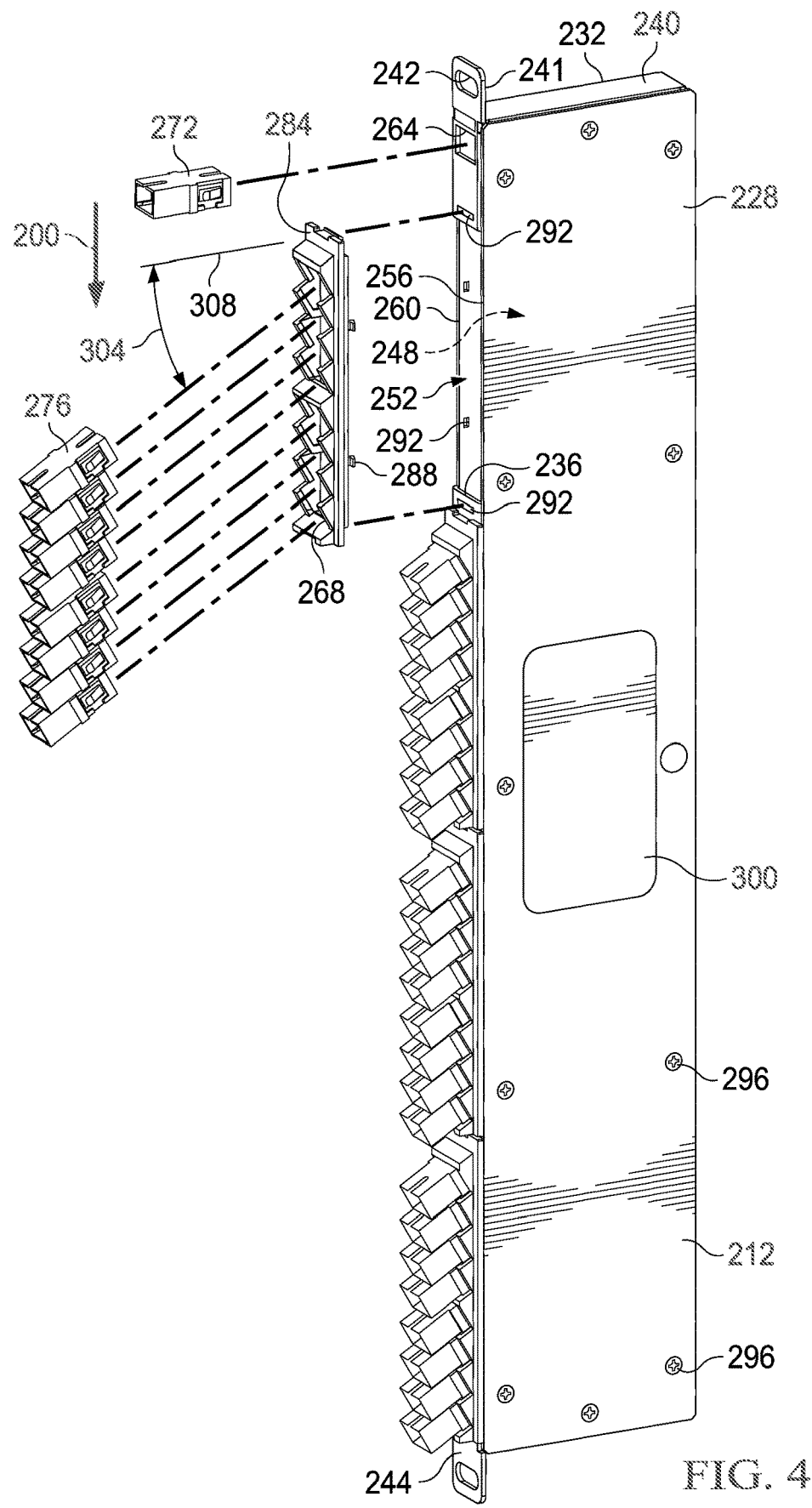
FIG. 4 is a schematic, perspective view of an illustrative embodiment of a splitter assembly for use as an aspect of a fiber optic splitter module of a fiber distribution hub.
Figure 5:
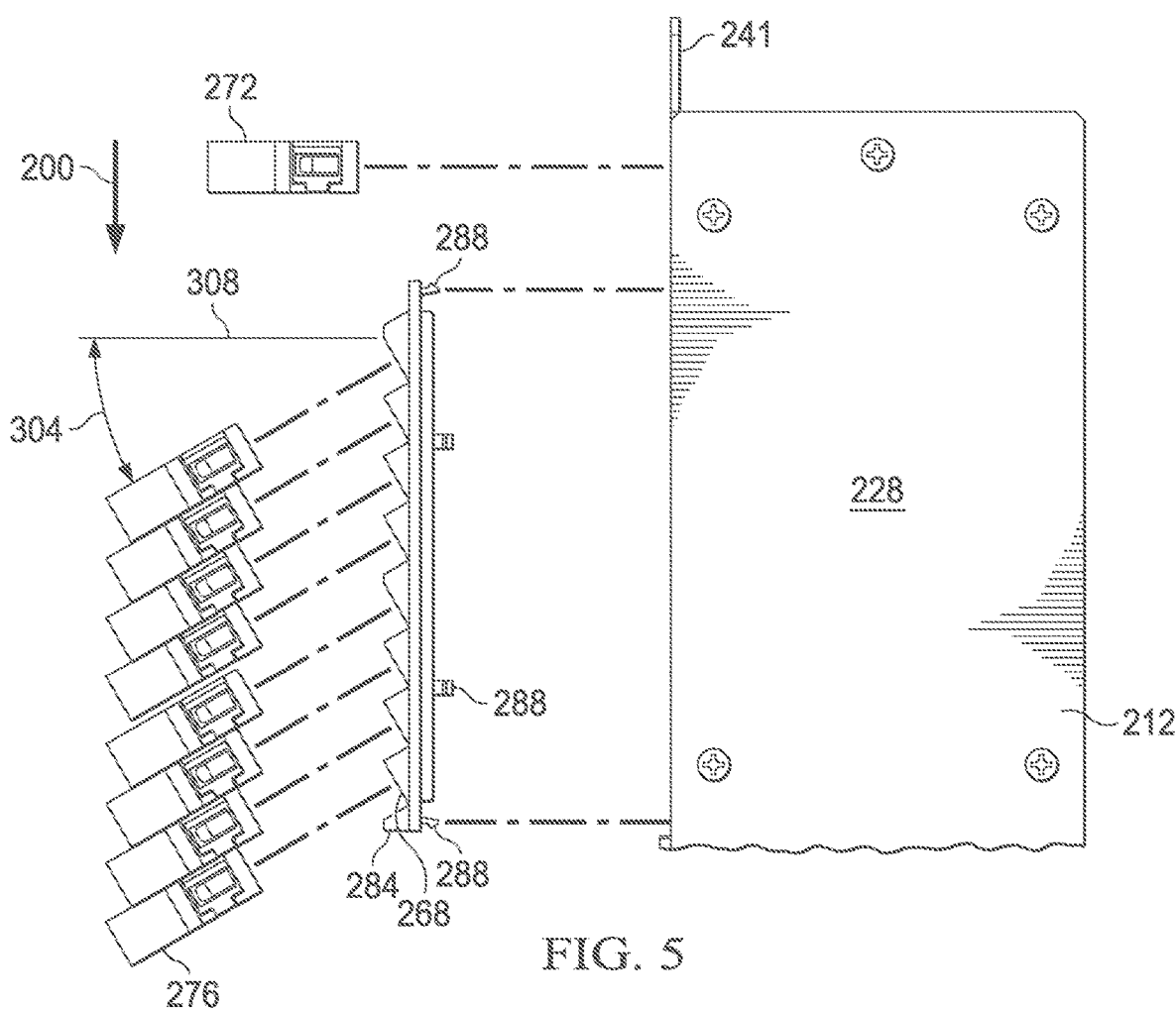
FIG. 5 is a schematic, exploded, elevation view of an illustrative embodiment of a portion of a splitter assembly for use as an aspect of a fiber optic splitter module of a fiber distribution hub.
Figure 6:
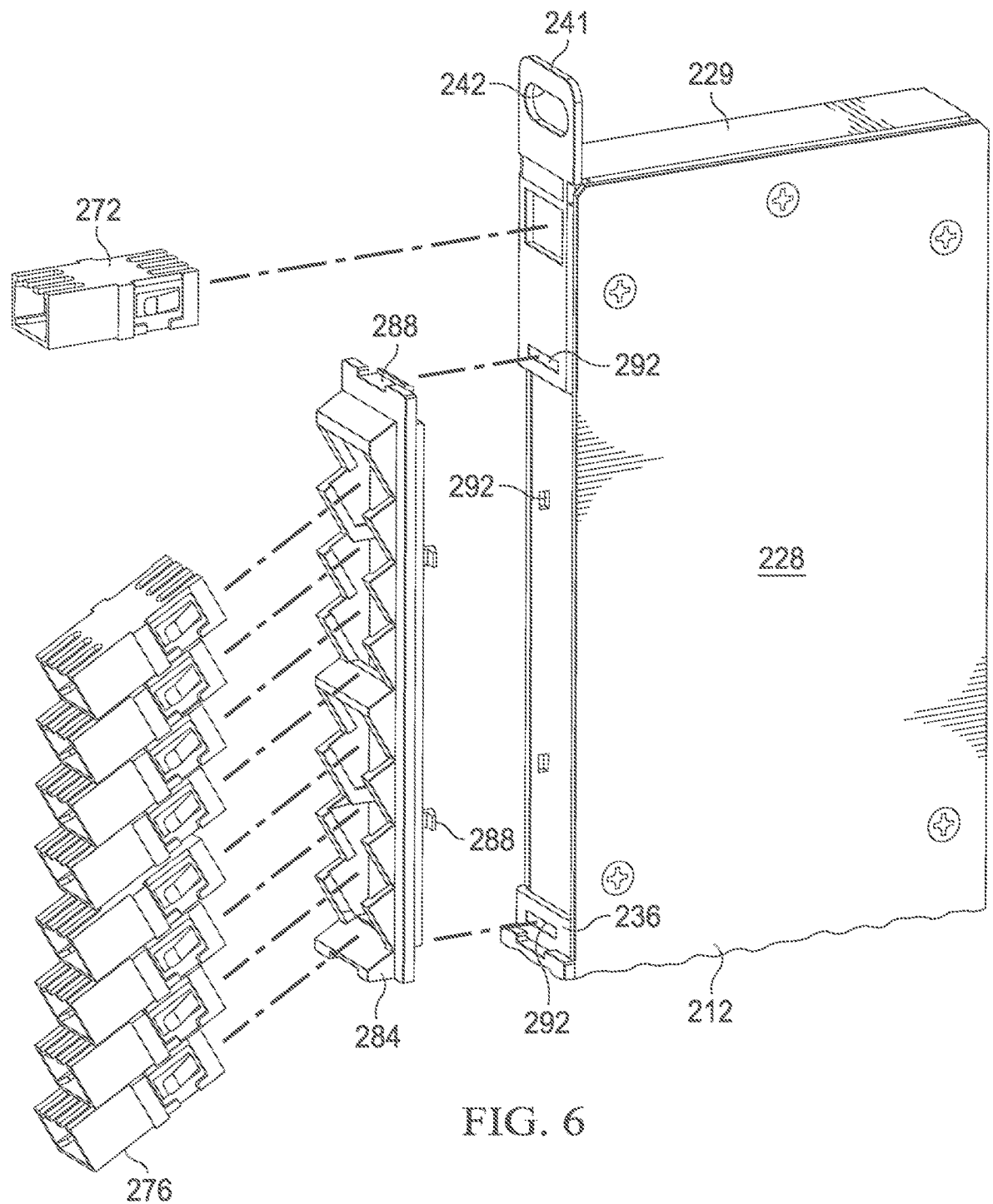
FIG. 6 is a schematic, exploded perspective view of an illustrative embodiment of a portion of a splitter assembly for use as an aspect of a fiber optic splitter module of a fiber distribution hub.
Figure 7:
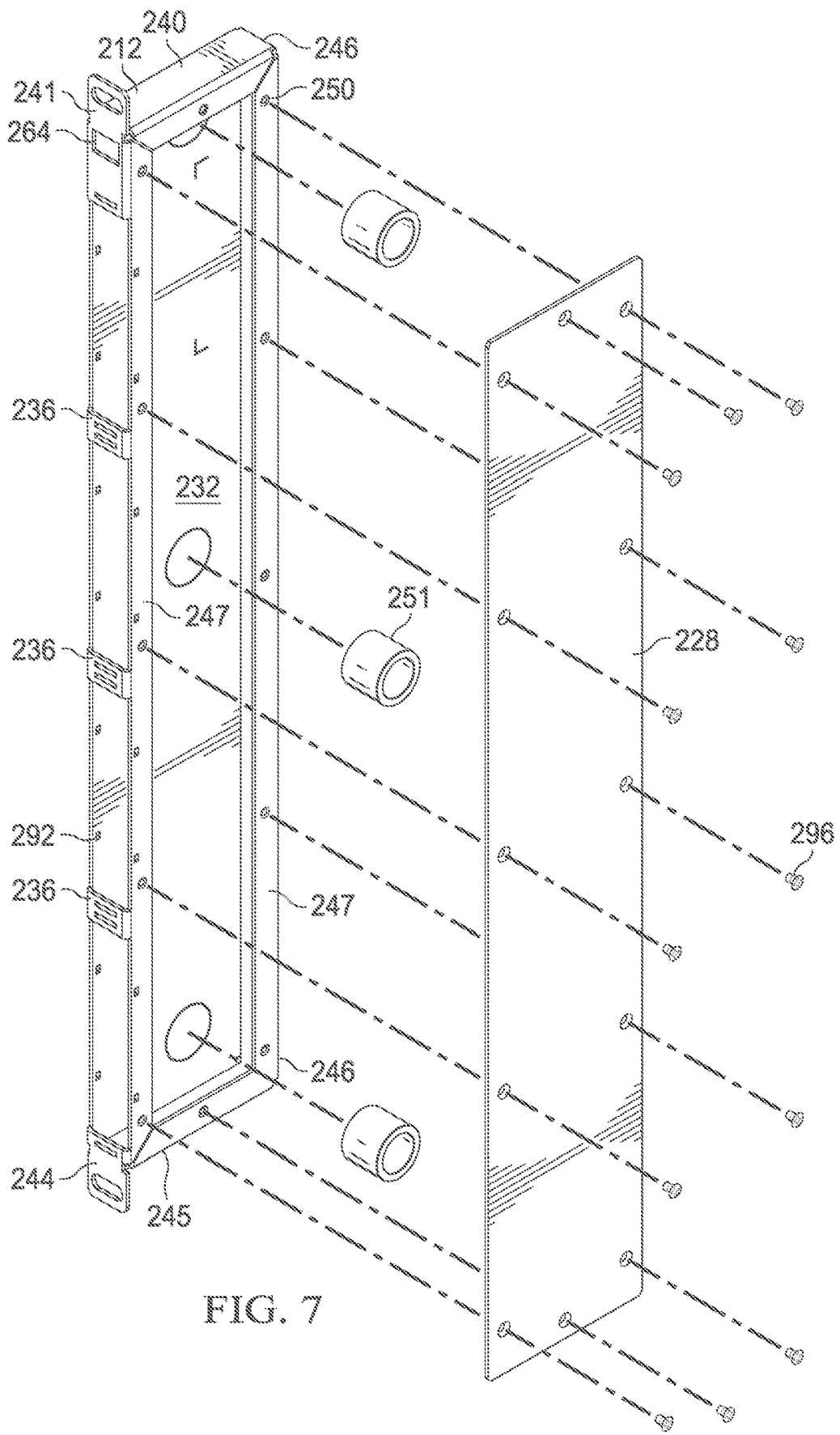
FIG. 7 is a schematic, exploded perspective view of an illustrative embodiment of a portion of a splitter assembly for use as an aspect of a fiber optic splitter module of a fiber distribution hub.

Referring now primarily to FIGS. 3-7, each of the at least one splitter assembly 212 includes a first side panel 228 and an opposed, spaced second side panel 232 (FIG. 4). In some embodiments, the first side panel 228 and second side panel 232 are formed from sheet metal. With reference to primarily to FIG. 7, the splitter assembly 212 may further include a splitter top wall 240, a splitter bottom wall 245, a back wall 246, and a plurality of front wall spacers 236. The first panel 228 may be fastened with fasteners, e.g., fasteners 296, to flanges 247, which may have receiving apertures 250. Once fasteners 296 are in place, the first side panel 228 and second side panel 232 are held in a spaced relationship, and an interior space 248 (FIG. 4) is formed between the first side panel 228 and second side panel 232. The interior space 248 may include internal spools 251 (FIG. 7) for managing cables within the splitter assembly 212. In one embodiment, the internal spools 251 are PVC tubes that are attached at designated locations using an adhesive or other fastener; the spools 251 may be used to help route the cables within the splitter assembly 212. One or more product labels 300 may be included on the first side panel 228 or analogously on an exterior of the second side panel 232.

As shown best by FIG. 7, the splitter assembly 212 in some embodiments may be formed from sheet metal components. In some such embodiments, the splitter assembly 212 is formed as a rectangular box with a collar 284 (FIGS. 5 and 6) on the front for the downward distribution ports 268. The splitter assembly 212 forms an enclosed unit. One side of the splitter assembly components, e.g., the one from which the second side panel 232 is formed, is cut and bent at its peripheral edges to make the top wall 240, bottom wall 245, back wall 246, and the front spacers 236 as well as the flanges 247. The other side is just the first side panel 228 that is fastened to the other portion, such as by screws 296 mating with holes 250. The holes 250 are on the flanges 247 formed by bending a portion of the first member (side panel 232) over as shown.

A top flange bracket 241 includes an aperture 242 for receiving a fastener 243 that couples the top flange bracket 241 to the top rail 184. An analogous arrangement exists for the bottom flange bracket 244. A front opening 252 is formed between a leading edge 256 of the first side panel 228 and a leading edge 260 of the second side panel 232. The front opening 252 of the splitter assembly 212 may have a plurality of front wall spacers 236 across the front opening 252.

The interior space 248 provides space for the optical devices and components to optically couple one or more input adapter ports 264 to a plurality of distribution ports 268. The interior space 248 includes a combination of an optical splitter of the types motioned elsewhere herein as well the distribution patch field. The input adapter port 264 is disposed in an upper portion of the front opening 252 proximate to the top rail 184. The input adapter port 264 is sized and configured to receive an input connector 272 (shown for clarity without an associated cable), which may be configured for any acceptable adapter, e.g., LC, MPO, MDC, SN, CS, or SC. Only one input adapter port 264 is shown, but in other embodiments, there may be a plurality of input adapter ports 264.

While the examples shown herein are all single input adapter ports 264, it should be understood that a number, e.g., 2, 3, or 4, input adapter ports may be used and two or more splitter devices may be included within the splitter assembly so that there are for example two 1×8s or two 1×16s, and the like. There can be multiples of the 1×X splitters.

The plurality of distribution ports 268 is disposed in the front opening 252 below the input adapter port 264 and above the bottom rail 188. Each of the input adapter ports 264 is sized and configured to receive a distribution connector 276 of a subscriber distribution cable 280 that optically couples to the end user's location. The distribution ports 268 may be configured for use with any appropriate adapter, e.g., LC, SN, MDC, MPO, SC, CS, or other adapter. The variable configurations allow for different arrangements; for example, in one embodiment, the input port may be an SC adapter and the distribution ports may be SCs. A 2×32 can be accommodated in the same splitter assembly 212 by deploying duplex LCs in place of SCs. In addition, higher density can be accomplished with optical adapter formats, e.g., MPO, SN, MDC, CS. If desired, adapter formats can be mixed in the same splitter assembly 212

As shown clearly in FIGS. 4-6, a collar or molded collar 284 may be disposed within the front opening 252. The collar 284 may include flexible barbed prongs 288 that are sized and configured to mate with apertures 292 formed on a portion of the splitter assembly housing 229, such as at an end or on a portion of an input adapter port 264 (see FIG. 4) or an aperture 292 on the side panels 228, 232, or on the front wall spacers 236. Other fastener arrangement may be used; for example screws, rivets, or glue. The collars 284 may be sized to provide for eight angled distribution ports 268 (or any subset of the plurality of distribution ports 268) in each for ease of visualization by the technician. Use of the collars 284 for ease of manufacture may create small gaps 286 between distribution ports 268 of different collars at the front wall spacers 236.

As referenced above, the distribution ports 268 may be numbered for reference from the bottom up. With reference to the Microsoft Excel analogy, the very bottom of the first column (first splitter assembly 212) would be cell A1 for a 1×32 splitter. In practice, in most situations, all the distribution ports 268 from the bottom up would be used first. In this regard, FIG. 3 shows some of the upper ports 268 being used sooner, but that is just for demonstration purposes. In other embodiments, different utilization may be made.

As shown clearly in FIGS. 4 and 5, the plurality of distribution ports 268 are angled downwardly. In some embodiments, the plurality of distribution ports 268 on the at least one splitter assembly 212 are downwardly angled at an angle 304 between 15 and 60 degrees from a reference line 308 that is orthogonal to the gravity field 200 as shown. In some embodiments, the angle 304 is 30, 35, 45, 50, 55, or 60 degrees. Other downward angles may be used.

Referring again to FIGS. 2 and 3, the fiber optic splitter module 132 also includes the cable manager 216, or vertical cable manager 216. The cable manager 132 is coupled between the front longitudinal edge 204 of the top rail 184 and the front longitudinal edge 208 of the bottom rail 188.

Figure 8:
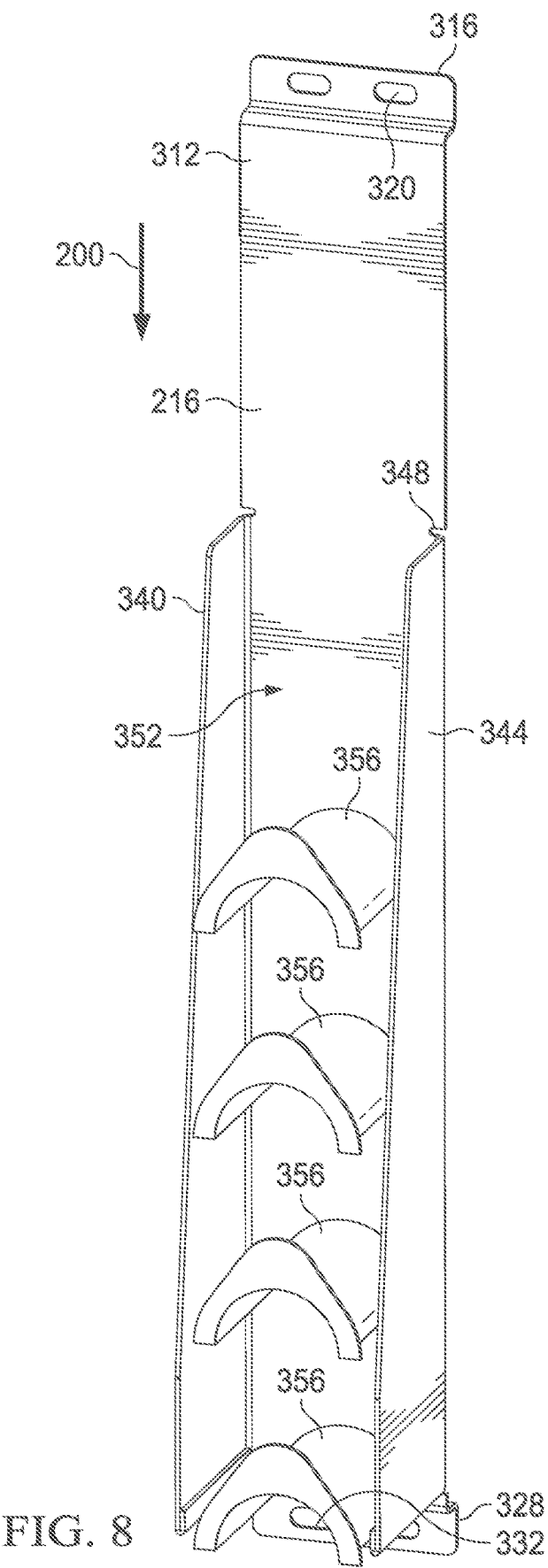
FIG. 8 is a schematic, perspective view of an illustrative embodiment of a vertical cable manager for use as an aspect of a fiber optic splitter module of a fiber distribution hub.

Referring now primarily to FIG. 8, an illustrative embodiment of the cable manager 216 is presented. The cable manager 216 includes a back wall 312, or cable-manager back wall, that is coupled between the top rail 184 and the bottom rail 188. A top portion of the back wall 312 may be formed with a ledge or flange 316 with one or more apertures 320 through which a fastener 324 (FIG. 3) may be used to couple the flange 316 to the top rail 184. Likewise, a bottom portion of the back wall 312 may be formed with a ledge or flange 328 having one or more apertures 332 for receiving a fastener 336 (FIG. 3) that couples the flange 328 to the bottom rail 188.

The vertical cable manager 216 includes a first cable-manager side wall 340 and a second cable-manager side wall 344. The cable-manager side walls 340, 344 may be formed by bending a winged portion of the back wall 312; notches 348 may facilitate such bends. The back wall 312, the first cable-manager side wall 340, and the second cable-manager side wall 344 form a front cable-management area 352. The cable-management area 352 helps maintain the cables 280 in the desired area and hold the free-form loops. A plurality of cable management spools 356 are coupled to the back wall 312 in the cable-management area 352. The cable management spools 356 are sized to avoid attenuation or damage to the cables 280. The subscriber distribution cables 280 may be managed by placing a portion of the cables 280 on the cable management spools 356 as shown in FIG. 3. As used herein, "spools" includes half spools, full spools, or any partial spools. In the illustrative embodiment shown, the plurality of cable management spools 356 includes four spools, but other numbers might be used.

The distribution cable is referred to as cable 280 when connected to the splitter assembly 212 and as cable 282 when in the yet-to-be-used situation. The distribution cable 280, 282 goes from the end user's facility and figuratively comes in at 354 into the cabinet and transitions from raw cable to breakout cable. The distribution cable 280, 282 enters and fans out there into individual fibers. Before use, the distribution cable 282 is stored in the storage rack 220 as described elsewhere.

At the beginning, before any users are connected, all the subscriber distribution cables 282 are stored and there are no distribution leads plugged into the splitter assembly 212. All the distribution leads of the subscriber distribution cables 282 are the same length. The distribution cables 282 are sized such that when secured in the cabinet 136, all the leads of the distribution cable 282 can hit every area in the patch field at the splitter assembly 212. Because excess slack in the bottom area is undesired, different vertical spools 356 are used to take up slack based on which distribution port 268 is ultimately used by the technician. So if a high point (top portion) of the splitter assembly 212 is currently the next distribution port 268 available, the lowest (closest to the bottom rail 188) spool 356 is used because there is less length of the cable 280 to absorb or manage. On the other hand, if the next available distribution port 268 is at the bottom portion, the distribution cable 280 is wrapped on the top spool (closest to the top rail 184) because there is more distribution cable 280 to manage. Use of intermediate distribution ports 268 would call for one of the middle spools 356 to be used.

The yet-to-be used distribution cable 282 also has to be managed as it is stored for later use. For this purpose, the fiber optic splitter module 132 also includes the storage rack 220. The storage rack 220 is coupled to the top rail 184 and the bottom rail 188. The storage rack 220 extends parallel to the gravity field 200. The storage rack 220 holds or helps manage unused subscriber distribution cables 282 (FIG. 3); that is, distribution cables that have yet to be coupled to one of the plurality of distribution ports 268. The storage rack 220 provides an organized and easy way to store the yet unused subscriber distribution cables 282 before they are used.

Figure 9:
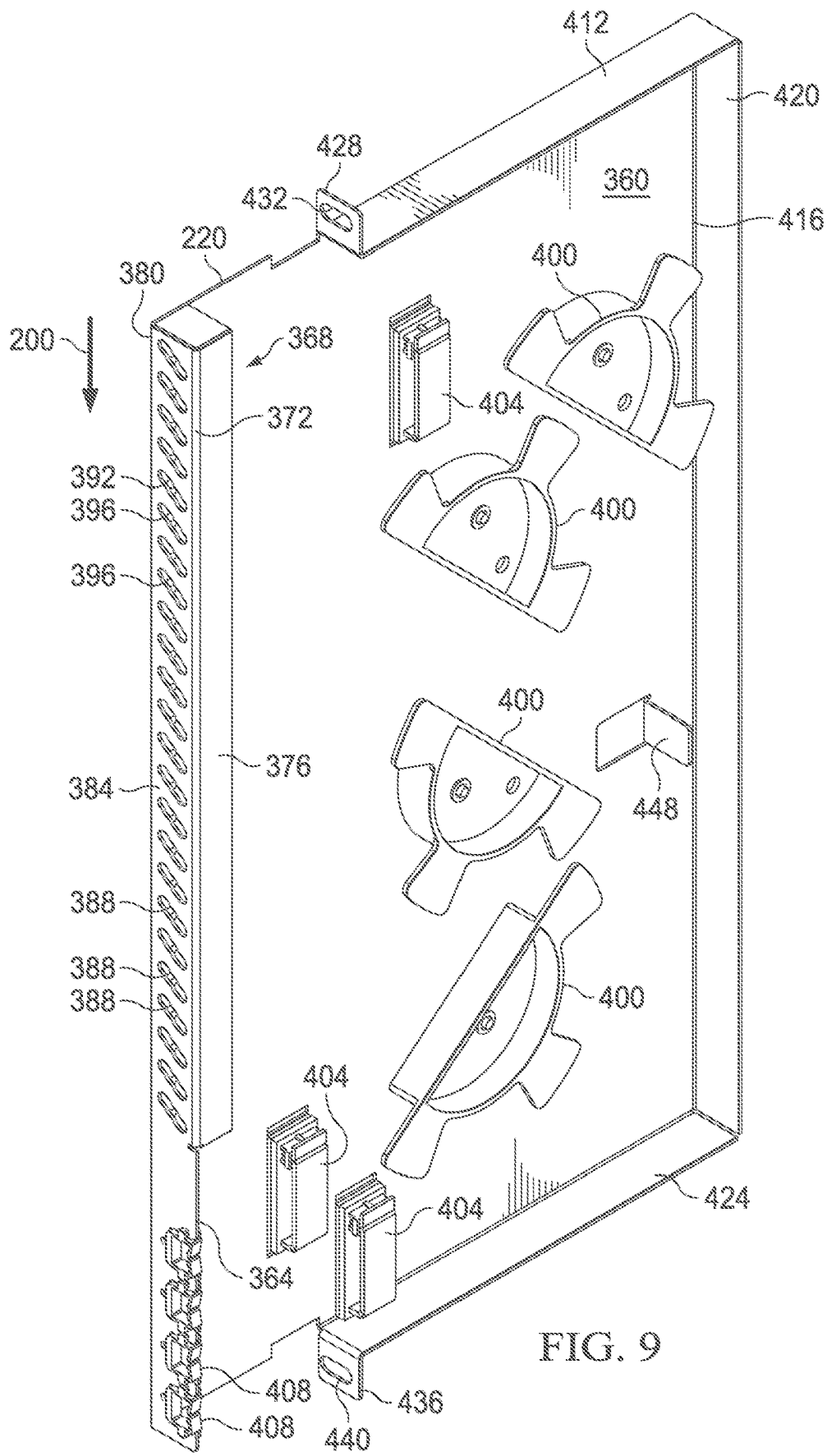
FIG. 9 is a schematic, perspective view of an illustrative embodiment of a storage rack for use as an aspect of a fiber optic splitter module of a fiber distribution hub.

Referring now primarily to FIG. 9, an illustrative embodiment of the storage rack 220 is presented. The storage rack 220 includes a first storage panel member 360 having a front longitudinal edge 364 that is bent twice at least along a front portion to form a holding channel 368. The holding channel 368 typically extends a length greater than half the longitudinal edge 364 of the front storage panel 364. The first bend 372 forms a side wall 376 and the second bend 380 forms a front face 384. A plurality of viewing apertures 388 is formed on the front face 384 of the holding channel 368.

An elastic member 392 (FIG. 3), e.g., a foam, such as EPDM, PORON, or the like, is sized and configured to fit within the holding channel 368 and be held there by an interference fit. The elastic member 392 is formed with a plurality of apertures 396 for receiving and holding (by interference fit) ends (with dust caps on) of the plurality of subscriber distribution cables 282 that have yet to be coupled to the plurality of distribution ports 268, i.e., that remained unused by any subscriber. In one embodiment, there are 48 apertures 396 for 48 connectors on the yet-to-be-used distribution cables 282. For manufacturing efficiency, the plurality of apertures 388 may be angled slots that allow a technician to view two different ends of the subscriber distribution cables 282 when backlit through a single slot for identification purposes. In this example, the angled slots angle down from left to right as viewed from the front, but other arrangements are possible. In some embodiments, the plurality of apertures 388 may be associated with the apertures 396 in a one-to-one fashion. Other longer slots, e.g., a vertical slot, may be used in some embodiments.

A number of cable management devices, e.g., cable-management spools 400 and cable-management clips 404, may be coupled to the first storage panel member 360 to assist with management of the yet-to-be-used distribution cables 282. The yet-to-be-used distribution cables 282 may enter the storage rack 220 through and be held by entry slots or ports 408. For clarity, it should be noted that the yet-to-be-used distribution cables 382 in FIG. 3 have been shown as "cut" at the entry slots or ports 408 for visibility but would continue on from the entry slots to the end user's facility or house (see FIG. 2).

The first storage panel member 360 may be bent on its peripheral edges on a top portion to form a top wall 412, bent on its peripheral edge on a back longitudinal edge 416 to form a back wall 420, and bent on its peripheral edge on a bottom portion to form a bottom wall 424. The channel 368 and walls 412, 420, and 424 form a cable management area. A leading edge of the top wall 412 may be bent upward to form a flange 428 having an aperture 432 formed in the flange 428 for securing to the top rail 184 with a fastener 434 (FIG. 3). Likewise, a leading edge of the bottom wall 424 may be bent downward to form a flange 436 having an aperture 440 for securing to the bottom rail 188 with a fastener 444 (FIG. 3).

A portion of the first storage panel member 360 may be partially punched and bent out to form an intermediate wall 448, or cable-chase wall, that functions to form a cable chase. Only one such intermediate wall 448 is shown, but a plurality of such walls may be formed.

Referring again primarily to FIG. 3, the fiber optic splitter module 132 may include a modified L-bracket 452 coupled to the front longitudinal edge 208 of the bottom rail 188. A flange 456 is formed on an outward facing portion of the modified L-bracket 452. The flange 456 has a plurality of clip openings 460. A plurality of ring clips 464, or plurality of patch field holders, is coupled to the flange 456 using the clip openings 460. The modified L-bracket forms a shelf that extends in front of the bottom rail 188 at a distance for holding the cables 280 in a desired plane to allow for good cable management. The ring clips 464 are for receiving and holding at least a portion of the in-use distribution subscriber cables 280.

In one illustrative application of installing a new user or subscriber, the technician would open the door of the cabinet 136 and—after identifying the desired cable 282 associated with the end user to be connected—loosen the fasteners, e.g., screws, at the top and the bottom holding the storage rack 220 to the rails 184, 188, displace the storage rack 220 out the front of the cabinet 136, pull the connector and associated yet-to-be-used distribution cable 282 of choice for the subscriber out of the elastic member 392, and snake the cable 282 through the cable management devices to free the cable 282. The yet-to-be-used cable 282 then becomes a distribution cable 280 ready to be optically coupled to the splitter assembly 212 at a distribution port 268. The technician moves the cable 280 over inside and onto the desired spool 356 of the cable manager 216 according to the length to be managed as described above and puts the cable 280 in the patch field and connects the cable 280 to the next available distribution port 268. After making the patch, the distribution cable 280 is drooped down and coupled to one of the ring clips 464 and then the distribution cable 280 is allowed to rest on its spool 356. The components are then secured before closing the cabinet 136.

According to an illustrative embodiment, a method of manufacturing a fiber optic splitter module 132 for use as a field distribution hub 116 in a passive optical network 100 includes forming an internal frame 172 having a top rail 184 and a bottom rail 188. The top rail 184 and bottom rail 188 are displaced from one another and extend longitudinally in a first direction 196 that is perpendicular to a gravity field 200. The top rail 184 has a front longitudinal edge 204 and the bottom rail 188 has a front longitudinal edge 208. The method further includes coupling at least one splitter assembly 212 vertically between the top rail 184 and bottom rail 188. The at least one splitter assembly 212 extends longitudinally parallel to the gravity field 200 when in an installed position. The at least one splitter assembly 212 may be of one the types previously described.

The method may also include coupling a cable manager 216 between the front longitudinal edge 204 of the top rail 184 and the front longitudinal edge 208 of the bottom rail 188. The method may also include coupling a storage rack 220 to the top rail 184 and the bottom rail 188 such that the storage rack 220 extends parallel to the gravity field 200. The storage rack 220 holds subscriber distribution cables 182 that have yet to be coupled to one of the plurality of distribution ports 268.

The illustrative embodiments presented offer many potential advantages. Some advantage that might result are referenced here. By having the rails 184, 188 run horizontally, the expansion of additional subscriber connections is horizontal, not vertical. That may help keep the cabinet smaller—certainly shorter. As another possible advantage, the downwardly angled distribution ports 268 may allow for better cable management, which may make the work of the technician easier. Using a standard 19 inch rail that has been turned 90 degrees may offer a number of benefits as well. These are only some of the possible advantages.

Although the present invention and its advantages have been disclosed in the context of certain illustrative, non-limiting embodiments, it should be understood that various changes, substitutions, permutations, and alterations can be made without departing from the scope of the invention as defined by the claims. It will be appreciated that any feature that is described in a connection to any one embodiment may also be applicable to any other embodiment.

What is claimed:

1. A fiber distribution hub for use in a passive optical network, the fiber optic distribution hub comprising:
    an internal frame having a top rail and a bottom rail, and wherein the top rail and bottom rail are displaced from one another and extend longitudinally in a first direction that is perpendicular to a gravity field, wherein the top rail has a front longitudinal edge and the bottom rail has a front longitudinal edge;
at least one splitter assembly coupled between the top rail and bottom rail and extending longitudinally parallel to the gravity field;
wherein each of the at least one splitter assembly comprises:
a first side panel, a second side panel, and one or more side walls coupled to the first side panel and the second side panel, together forming an interior space,
a front opening between a leading edge of the first side panel and a leading edge of the second side panel,
at least one input adapter port disposed in an upper portion of the front opening proximate the top rail, and
a plurality of distribution ports disposed in the front opening below the input adapter and above the bottom rail; and
a storage rack coupled to the top rail and the bottom rail and extending parallel to the gravity field, the storage rack for holding subscriber distribution cables that have yet to be coupled to one of the plurality of distribution ports.

2. The fiber distribution hub of claim 1, further comprising a vertical cable manager coupled between the front longitudinal edge of the top rail and the front longitudinal edge of the bottom rail.

3. The fiber distribution hub of claim 2, wherein the plurality of distribution ports on the at least one splitter assembly are downwardly angled between 15 and 60 degrees from a reference line that is orthogonal to the gravity field.

4. The fiber distribution hub of claim 2, wherein the plurality of distribution ports on the at least one splitter assembly are angled at 30 degrees from a reference line that is orthogonal to the gravity field.

5. The fiber distribution hub of claim 2, wherein the top rail and bottom rail are standard 19-inch rails compliant under EIA/ECA-310-E.

6. The fiber distribution hub of claim 2, wherein the first side panel and second side panel are formed from sheet metal, and further comprising a collar formed to receive a subset of the plurality of distribution ports, and wherein the plurality of distribution ports are downwardly angled between 15 and 60 degrees from a reference line that is orthogonal to the gravity field.

7. The fiber distribution hub of claim 2, wherein the vertical cable manager comprises:
a cable-manager back wall that is coupled between the top rail and the bottom rail;
a first cable-manager side wall;
a second cable-manager side wall;
wherein the cable-manager back wall, the first cable-manager side wall, and the second cable-manager side wall form a front cable-management area; and
a plurality of cable management spools coupled to the cable-manager back wall in the cable-management area.

8. The fiber distribution hub of claim 2, wherein the vertical cable manager comprises:
a cable-manager back wall that is coupled between the top rail and the bottom rail;
a first cable-manager side wall;
a second cable-manager side wall;
wherein the cable-manager back wall, the first cable-manager side wall, and the second cable-manager side wall form a front cable-management area; and
four cable management spools coupled to the cable-manager back wall in the cable-management area.

9. The fiber distribution hub of claim 2, wherein the storage rack comprises:
a first storage panel member having a front longitudinal edge that is bent at least along a front portion to form a holding channel;
a plurality of viewing slots formed on a face of the holding channel; and
an elastic member sized and configured to fit within the holding channel and having a plurality of apertures formed in the elastic member for receiving and holding by interference fit the plurality of subscriber distribution cables that have yet to be coupled to the plurality of distribution ports.

10. The fiber distribution hub of claim 9, further comprising a plurality of storage rack cable spools coupled to the first storage panel for managing a portion of the subscriber distribution cables that have yet to be coupled to the plurality of distribution ports.

11. The fiber distribution hub of claim 9, further comprising at least one cable-chase wall coupled to and formed from the first panel member of the storage rack.

12. The fiber distribution hub of claim 2, further comprising:
a modified L-bracket coupled to the front longitudinal edge of the bottom rail;
wherein a flange is formed on an outward facing portion of the modified L-bracket;
wherein the flange of the modified L-bracket has a plurality of clip openings; and
a plurality of ring clips coupled to the flange of the modified L-bracket for receiving and holding at least a portion of the distribution subscriber cables.

13. The fiber distribution hub of claim 2,
wherein the plurality of distribution ports on the at least one splitter assembly are angled between 15 and 60 degrees from a reference line that is orthogonal to the gravity field;
wherein the first side panel and second side panel are formed from sheet metal, and further comprising a molded collar formed to receive a subset of the plurality of distribution ports;
wherein the vertical cable manager comprises:
a cable-manager back wall that is coupled between the top rail and the bottom rail,
a first cable-manager side wall,
a second cable-manager side wall,
wherein the cable-manager back wall, the first cable-manager side wall, and the second cable-manager side wall form a front cable-management area, and
a plurality of cable management spools coupled to the cable-manager back wall in the cable-management area;
wherein the storage rack comprises:
a first storage panel member having a front longitudinal edge that is bent at least along a portion of the front longitudinal edge,
a plurality of viewing slots formed on a front face of the holding channel, and
an elastic member sized and configured to fit within the holding channel and having a plurality of apertures formed in the elastic member for receiving and holding by interference fit the plurality of subscriber distribution cables that have yet to be coupled to the plurality of distribution ports;

further comprising a plurality of storage rack cable spools coupled to the first storage panel for managing a portion of the subscriber distribution cables that have yet to be coupled to the plurality of distribution ports;

further comprising at least one cable-chase wall coupled to and formed from the first panel member of the storage rack; and further comprising:

a modified L-bracket coupled to the front longitudinal edge of the bottom rail, wherein a flange of the modified L-bracket is formed on an outward facing portion of the modified L-bracket, wherein the flange of the modified L-bracket has a plurality of clip openings, and a plurality of ring clips coupled to the flange for receiving and holding at least a portion of the distribution subscriber cables.

14. A fiber distribution hub comprising:

a fiber distribution cabinet;

a fiber optic splitter module coupled to and disposed within the fiber distribution cabinet; and wherein the fiber optic splitter module comprises:

a top rail and a bottom rail coupled to the fiber distribution cabinet, wherein the top rail and bottom rail are displaced from one another and extend longitudinally in a first direction that is perpendicular to a gravity field, wherein the top rail has a front longitudinal edge and the bottom rail has a front longitudinal edge, at least one splitter assembly coupled between the top rail and bottom rail and extending longitudinally parallel to the gravity field, wherein the at least one splitter assembly comprises:

a housing body having a first side panel and a second side panel, and wherein an interior space is formed in the housing body, a front opening between a leading edge of the first side panel and a leading edge of the second side panel, an input adapter port disposed in an upper portion of the front opening proximate the top rail, the input adapter port sized and configured to receive an input adapter, and a plurality of distribution ports disposed in the front opening below the input adapter and above the bottom rail, a vertical cable manager coupled between the front longitudinal edge of the top rail and the front longitudinal edge of the bottom rail, and a storage rack coupled to the top rail and the bottom rail and extending parallel to the gravity field, the storage rack for holding subscriber distribution cables that have yet to be coupled to one of the plurality of distribution ports.

15. The fiber distribution hub of claim 14, wherein the plurality of distribution ports on the at least one splitter assembly are downwardly angled between 15 and 60 degrees from a reference line that is orthogonal to the gravity field.

16. The fiber distribution hub of claim 14, wherein the plurality of distribution ports on the at least one splitter assembly are downwardly angled at 30 degrees from a reference line that is orthogonal to the gravity field.

17. The fiber distribution hub of claim 14, wherein the storage rack comprises:

a first storage panel member having a front longitudinal edge that is bent at least along a portion that is greater than half the longitudinal edge to form a holding channel;

a plurality of viewing slots formed on a front face of the holding channel; and an elastic member sized and configured to fit within the holding channel and having a plurality of apertures formed in the elastic member for receiving and holding by interference fit the plurality of subscriber distribution cables that have yet to be coupled to the plurality of distribution ports.

18. A method of manufacturing a field distribution hub for use in a passive optical network, the method comprising:

forming a cabinet;

forming a frame having a top rail and a bottom rail, wherein the top rail and bottom rail are displaced from one another and extend longitudinally in a first direction that is perpendicular to a gravity field, and wherein the top rail has a front longitudinal edge and the bottom rail has a front longitudinal edge;

coupling at least one splitter assembly between the top rail and bottom rail, wherein the at least one splitter assembly extends longitudinally parallel to the gravity field when in an installed position; and wherein the at least one splitter assembly comprises:

a housing having a first side panel and a second side panel and having an interior space between the front side panel and the second side panel, a front opening between a leading edge of the first side panel and a leading edge of the second side panel, at least one input adapter port disposed in an upper portion of the front opening proximate the top rail, and a plurality of distribution ports disposed in the front opening below the input adapter and above the bottom rail.

19. The method of manufacturing a field distribution hub of claim 18, further comprising:

coupling a vertical cable manager between the front longitudinal edge of the top rail and the front longitudinal edge of the bottom rail; and coupling a storage rack to the top rail and the bottom rail such that the storage rack extends parallel to the gravity field, the storage rack for holding subscriber distribution cables that have yet to be coupled to one of the plurality of distribution ports.

20. The method of manufacturing a field distribution hub of claim 18, wherein the plurality of distribution ports on the at least one splitter assembly are downwardly angled between 15 and 60 degrees from a reference line that is orthogonal to the gravity field.

21. The method of manufacturing a field distribution hub of claim 18, wherein the plurality of distribution ports on the at least one splitter assembly are downwardly angled at 30 degrees from a reference line that is orthogonal to the gravity field.

22. The method of manufacturing a field distribution hub of claim 18, wherein the first side panel and second side panel are formed from sheet metal, and further comprising a molded collar formed to receive a subset of the plurality of distribution ports that are downwardly angled between 15 and 60 degrees from a reference line that is orthogonal to the gravity field.

* * * * *